United States Patent [19]

Moriya et al.

[11] Patent Number: 4,544,957
[45] Date of Patent: Oct. 1, 1985

[54] TIME BASE CORRECTION APPARATUS

[75] Inventors: Mitsuro Moriya, Neyagawa; Makoto Ichinose, Hirakata, both of Japan

[73] Assignee: Matsushita Electric Industrial Co., Ltd., Osaka, Japan

[21] Appl. No.: 444,038

[22] Filed: Nov. 23, 1982

[30] Foreign Application Priority Data

Nov. 24, 1981 [JP] Japan .............................. 56-188776
Mar. 29, 1982 [JP] Japan .............................. 57-51741

[51] Int. Cl.⁴ .............................................. H04N 5/76
[52] U.S. Cl. ...................................... 358/338; 358/322
[58] Field of Search ............... 358/338, 337, 342, 321, 358/320, 323; 360/69, 73; 369/47, 50

[56] References Cited

U.S. PATENT DOCUMENTS 3,347,997 10/1967 Woodruff ...................... 358/338 X
3,940,556 2/1976 Boltz, Jr. ........................ 358/338
3,959,815 5/1976 Rotter et al. ..................... 358/338
4,390,977 6/1983 Onigata et al. .................. 369/50

Primary Examiner—Robert L. Richardson
Attorney, Agent, or Firm—Stevens, Davis, Miller & Mosher

[57] ABSTRACT

A time base correction apparatus is provided for use with a system for reproducing signals recorded on a recording medium. A first drive unit which rotates the recording medium is driven by a first control unit which receives a reference signal and controls the first drive unit to rotate the recording medium in phase synchronization with the reference signal. The high frequency component of the time base variation is corrected by a second drive unit which moves a transducer, which reproduces a signal from the recording medium, from one scanning position to another relative to the recording medium in a reverse direction of the signal track of the recording medium.

6 Claims, 23 Drawing Figures

TIME BASE CORRECTION APPARATUS

BACKGROUND OF THE INVENTION

The present invention relates to a system for reproducing signals recorded on a recording medium, and more particularly to a time base correction apparatus for correcting the jitter or time base variation caused in a reproduced signal.

One suitable system for incorporating the invention is an optical static picture recording and reproducing system employing a disk-type recording medium which is rotatable driven.

In the color video signal recording and reproducing method of this system, the color video signal can be processed without any change in the phase of a reproduced color signal even in the presence of a time base variation. One example of the method converts a 3.58 MHz color signal to a low frequency, e.g., 630 kHz signal, combines it with an FM modulated luminance signal and records the same, and another example converts a 3.58 MHz color signal to a low frequency, e.g., 1.5 MHz signal, FM modulates it along with a luminance signal and records the same.

With these color video signal recording and reproducing methods, it is well known that the reproduction of a color signal without any phase change even in the presence of time base variation can be accomplished by means of the circuitry itself and will not be described.

With the above-described color video signal recording and reproducing methods, if the reproduced video signal having time base variation is displayed on a monitor, bending or flagging of the picture is caused although no color phase irregularity occurs.

It is also known that if the frequency of the time base variation is low, there is practically no effect on the picture displayed on the monitor.

In the case of the system comprising (a) a motor for rotating a disk-type recording medium having concentric tracks (b), transducer means for recording signals on the recording medium or reproducing the signals recorded on the recording medium, (c) a control element responsive to an input control signal to reversively move the scan position of the transducer means in the track direction over the recording medium, (d) reproduced synchronizing signal detecting means for separating the synchronizing signal (e.g., the horizontal synchronizing signal of the picture) from the reproduced signal from the transducer means, (e) reference signal generating means for generating a reference signal and (f) phase comparison means for comparing in phase the signal from the reference signal generating means and the signal from the reproduced synchronizing signal detecting means and generating a control signal corresponding to a time base variation component, the conventional time base correcting method is such that if the scanning position of the transducer means is located on the recorded track, the control signal from the phase comparison means is applied to the motor and the control element so that the rotation of the motor is controlled and the control element is also controlled thereby correcting the time base variation. The relation between the control of the motor rotation and the control of the control element is such that the low frequency component of the time base variation is mainly corrected through the control of the motor rotation and the high frequency component of the time base variation is mainly controlled through the control of the control element.

With this system, each picture is recorded on one concentric track on the recording medium by modulating the intensity of a light beam generated from a light source into intensity variations in response to the video signal.

Also, sequential address signals are preliminarily recorded on the tracks and any desired one of the tracks can be sought or searched in accordance with the address signals.

One of the important functions of this system is the high speed searching of any desired one of the large number of recorded pictures.

The method of time base correction used in connection with the searching of any desired picture will now be described. When the search address corresponding to the desired picture is applied to the system, the application of the signal from the phase comparison means to the motor and the control element is stopped and the whole transducer means is moved at a high speed in the radial direction of the recording medium thereby searching the track on which the desired picture is recorded. Then, the signal from the phase comparison means is first applied to the motor controlling its rotation at a given speed and then the signal from the phase comparison means is applied to the control element thereby correcting the time base variation.

To search the adjacent track, the rotation of the motor is first controlled to a given speed and then the control element is controlled.

The reason for controlling in this way is that the recording of the system is performed intermittently and consequently there may be a case where there exists no correlation in time base variation between even the adjacent tracks.

This conventional time base correction method is disadvantageous in that a considerable time is required before controlling the rotation of the motor at a given speed due to the deteriorated response of the motor control system caused by the large inertia and thus much time is required before the time base variation is corrected and the proper video signal is generated, thereby increasing the search time.

Another disadvantage is that the motor control system is susceptible to vibrations or the like and there is the danger of variation in the motor circuit exceeding the operable range of the control element with the resulting decrease in the reliability of the time base control.

SUMMARY OF THE INVENTION

It is the primary object of this invention to provide a time base correction apparatus which is capable of completing the correction of time base variation instantaneously, possesses a high-speed pull-in response characteristic and is highly reliable in operation.

In accordance with the invention there is thus provided a time base correction apparatus comprising transducer means for reproducing signals recorded on a recording medium, first driver means for relatively moving the recording medium and the scanning position of the transducer means along the recorded signal track on the recording medium, second driver means for relatively and reversible moving the recording medium and the scanning position of the transducer means along said track over a narrow limited range, reference signal generating means for generating a reference signal, first control means for controlling so as to move the first driver means in synchronism with the signal from the reference signal generating means, reproduced synchronizing signal detecting means for detecting the synchronizing signal included in the reproduced signal from the transducer means, phase changing means responsive to an input signal for changing the phase of a signal from the reference signal, generating means and for generating the phase-changed signal, phase comparing means for comparing in phase the signal from the phase changing means and the signal from the reproduced synchronizing signal detecting means and generating a signal corresponding to the phase difference between the signals, second control means responsive to the signal from the phase comparing means to control the phase of the signal from the phase changing means, and third control means responsive to the signal phase comparing means to control the second driver means, whereby the low frequency component of the time base variation having no effect on the picture on a monitor is absorbed in terms of circuitry by the second control means and the high frequency component of the time base variation is corrected by the third control means.

DESCRIPTION OF THE PREFERRED EMBODIMENT

Figure 1:
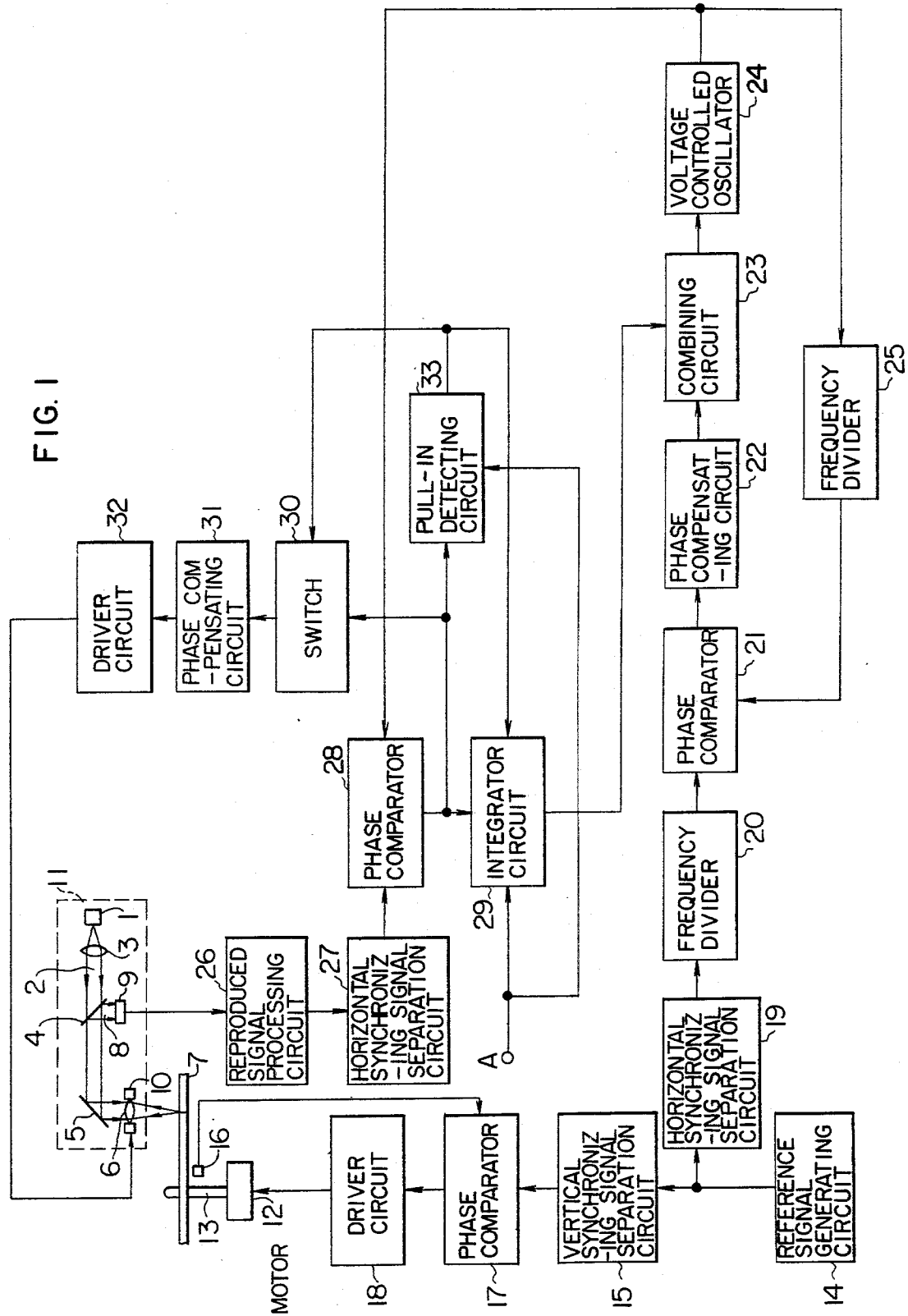
FIG. 1 is a block diagram showing an embodiment of the invention.

In accordance with the invention, a time base correction apparatus comprises transducer means for reproducing signals recorded on a recording medium, first driver means for relatively moving the recording medium and the scanning position of the transducer means along the recorded signal track on the recording medium, second driver means for relatively and reversibly moving the recording medium and the scanning position of the transducer means along the track over a limited range, reference signal generating means for generating a reference signal, first control means for controlling so as to move the first driver means in synchronism with the signal from the reference signal generating means, reproduced synchronizing signal detecting means for detecting the synchronizing signal included in the reproduced signal from the transducer means, phase changing means responsive to an input signal for change the phase of the signal from the reference signal generating means and for generating the phase-changed signal, phase comparing means for comparing in phase the signal from the phase changing means and the signal from the reproduced synchronizing signal detecting means and generating a signal corresponding to the phase difference between the signals, second control means responsive to the signal from the phase comparing means to control the phase of the signal from the phase changing means, and third control means responsive to the signal from the phase comparing means to control the second control means.

The relation between the second and third control means is such that the second control means absorbs the low frequency component of the time base variation which has heretofore been controlled by the motor and the third control means controls the high frequency component of the time base variation. For this purpose, it is only necessary to design so that the loop gain of the second control means is greater than the loop gain of the control system of the third control means in the low frequency range.

If it is arranged so that an integrator circuit is included in the control system of the second control means and the loop gain of the control system increases as the frequency decreases, the control systems of the second and third control means are stabilized considerably. In this case, to allow the control system of the second control means to pull in stably, it is only necessary to arrange so that the integrator circuit generates a given value just before the third control means is operated.

Also, when beginning the correction of the time base variations, the second control means is operated first absorbing the low frequency component of the time base variation and then the third control means is operated thus preventing the second driver means from being moved by the low frequency component of the time base variation and thereby stabilizing the pull-in of the third control means considerably. Also, in operating the second control means, the pull-in time of the control system of the second control means can be reduced considerably by arranging such that the response of the control system of the second control means is increased thereby causing the control system to pull in and then the response of the control system is slowed thereby controlling the low frequency component of the time base variation.

The phase changing means may comprise fourth control means for controlling so that the signal from a voltage controlled oscillator whose output signal frequency varies in accordance with the input signal is synchronized with the signal from the reference signal generating means.

In this case, the voltage controlled oscillator is included in the control systems of the second and fourth control means and is controlled by the second and fourth control means.

More particularly, the voltage controlled oscillator is controlled by the second control means in the low frequency range and is controlled by the fourth control means in the high frequency range. The signal from the voltage controlled oscillator is a reference signal for detecting the time base variation and it must have a very high degree of accuracy. If the voltage concrolled oscillator is controlled by the second control means alone, a phase variation unrelated to the actual time base variation is produced in the signal from the voltage controlled oscillator thus making it impossible to correct the time base variation accuracy. To prevent it, the voltage controlled oscillator is controlled by the fourth control means. To do so, it is only necessary to design so that the loop gain of the control system of the second control means is greater than the loop gain of the control system of the fourth control means in the low frequency range.

The present invention will now be described in greater detail with reference to the accompanying drawings. With the reference numerals used in the drawings, the same numerals designate the same component parts.

FIG. 1 shows an embodiment of the invention. Now referring to its optical system, a light beam 2 produced from a light source 1 including a semiconductor laser or the like is converted to a parallel beam of light by a coupling lens 3, passed through a beam splitter 4, reflected by a reflecting mirror 5 and converged onto a recording medium 7 by a converging lens 6. A reflected light 8 from the recording medium 7 is passed again through the converging lens 6, reflected by the reflecting mirror 5 and the beam splitter 4 and projected onto a light sensor 9. The converging lens 6 is mounted on an element 10 which is constructed so that the converging lens 6 is moved in the track direction over the recording medium 7 and the light beam 2 is scanned in the track direction.

The optical system including the element 10 is mounted on a carriage 11 so as to be moved, along with the carriage 11, in the radial direction of the recording medium 7.

The light beam 2 converged onto the recording medium 7 is subjected to a focusing control so as to always maintain the beam diameter constant and also it is subjected to a tracking control so as to always locate it on the track on the recording medium 7. These controls have no bearing on the present invention and will not be described in detail.

The recording medium 7 is mounted on a rotary shaft 13 of a motor 12 for rotation.

The rotation control of the motor 12 will now be described. A reference signal generating circuit 14 generates a composite synchronizing signal of the same period as the video signal, and a vertical synchronizing signal separation circuit 15 separates the vertical synchronizing signal from the output signal of the reference signal generating circuit 14 and then divides the frequency of the vertical synchronizing signal by a factor of 2. A rotation sensor 16 (e.g., a photo coupler) detects the rotational phase of the recording medium 7 and it generates a pulse each time the recording medium 7 makes one rotation. A phase comparator 17 compares in phase the signal from the vertical synchronizing signal separation circuit 15 and the signal from the rotation sensor 16 and generates a signal corresponding to the phase difference between the signals. The signal from the phase comparator 17 is applied to the motor 12 through a driver circuit 18 so that the motor 12 is controlled at a given rotational condition, e.g., it is controlled to rotate at 1,800 rpm in the case of the video signal of the NTSC system. The phase comparator 17, the driver circuit 18, the motor 12 including the rotary shaft 13, the recording medium 7 and the rotation sensor 16 form a first control loop.

The correction of the jitter or time base variation will be described. A horizontal synchronizing signal separation circuit 19 separates the horizontal synchronizing signal from the output signal of the reference signal generating circuit 14, and a frequency divider circuit 20 divides the frequency of the signal from the horizontal synchronizing signal separation circuit 19 by a factor of N (N is an integer greater than 1). A phase comparator 21, a phase compensating circuit 22, a combining circuit 23, a voltage controlled circuit 24 and a frequency divider circuit 25 form a fourth control loop. The voltage controlled oscillator 24 generates a signal whose frequency corresponds to the input signal and the frequency divider circuit 25 divides the frequency of the signal from the voltage controlled oscillator 24 by a factor of N. The phase comparator 21 compares in phase the signal from the frequency divider circuit 20 and the signal from the frequency divider circuit 25 and generates a signal corresponding to the phase difference between the signals. The phase compensating circuit 22 compensates the phase of the fourth control loop, and the signal from the phase comparator 21 is applied to the voltage controlled oscillator 24 via the phase compensating circuit 22 and the combining circuit 23. Thus, the voltage controlled oscillator 24 is controlled so that its output signal is synchronized with the signal from the horizontal synchronizing signal separation circuit 19.

A reproduced signal processing circuit 26 recovers the video signal from the output signal of the light sensor 9, and a horizontal synchronizing signal separation circuit 27 separates the horizontal synchronizing signal from the reproduced video signal from the reproduced signal processing circuit 26. A phase comparator 28 compares in phase the signal from the horizontal synchronizing signal separation circuit 27 and the signal from the voltage controlled oscillator 24 and generates a signal corresponding to the phase difference between the signals. The phase comparator 28, an integrator circuit 29, the combining circuit 23 and the voltage controlled oscillator 24 form a second control loop.

On the other hand, the phase comparator 28, a switch 30, a phase compensating circuit 31, a driver circuit 32, the optical system including the element 10, the reproduced signal processing circuit 26 and the horizontal synchronizing signal separation circuit 27 form a third control loop.

Before describing the second and third control loops, a pull-in detecting circuit 33 and the integrator circuit 29 will be described with reference to FIGS. 2 and 3.

Figure 2:
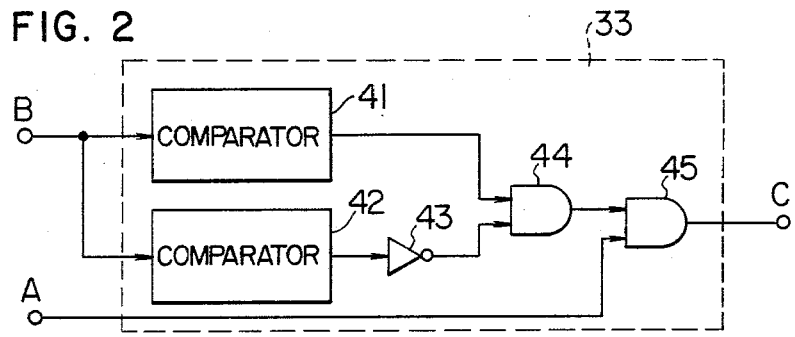
FIG. 2 is a circuit diagram showing the construction of a pull-in detecting circuit 33.

In FIG. 2, the pull-in detecting circuit 33 comprises comparators 41 and 42, an inverter circuit 43 and AND circuit 44 and 45.

Now describing the corresponding relation between FIGS. 1 and 2, an input terminal A is the input terminal A shown in FIG. 1 and applied to the input terminal A is a command signal which goes to a high level to enable the time base correction control. The signal from the phase comparator 28 is applied to an input terminal B and the signal from an output terminal C is applied to the integrator circuit 29 and the switch 30, respectively.

The comparators 41 and 42 respectively have threshold levels $V_1$ and $V_2$ which are different from each other and are each so designed that its output goes to the high level when the signal from the phase comparator 28 becomes higher than the threshold level. The threshold level $V_1$ is preset lower than the threshold level $V_2$. The inverter circuit 43 inverts the polarity of the signal from the comparator 42, and the AND circuit 44 generates a high-level signal only when the signal from the comparator 41 and the signal from the inverter circuit 43 are both at the high level. As a result, the output of the AND circuit 44 goes to the high level when the signal $V_0$ from the phase comparator 28 becomes $V_2 > V_0 > V_1$. The output of the AND circuit 45 goes to the high level when both of the signal at the input terminal A and the signal from the AND circuit 44 go to the high level.

Figure 3:
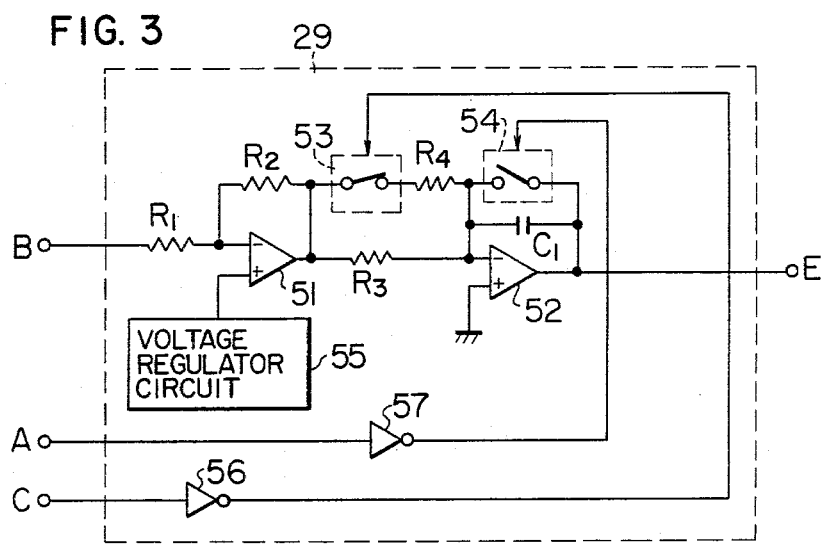
FIG. 3 is a circuit diagram showing the construction of an integrator circuit 29.

Referring now to FIG. 3, the integrator circuit 29 includes fixed resistors $R_1$, $R_2$, $R_3$ and $R_4$, a capacitor $C_1$, differential amplifiers 51 and 52 each having large input impedance and amplification factor, switches 53 and 54, a voltage regulator circuit 55 for generating a constant voltage and inverter circuits 56 and 57 each of which inverts the polarity of the input signal.

Referring to the corresponding relationship between FIGS. 1 and 3, an input terminal A is the input terminal A shown in FIG. 1 and applied to the input terminal A is the command signal which goes to the high level to enable the time base correction control. The signal from the pull-in detecting circuit 33 is applied to an input terminal C and the signal from the phase comparator 28 is applied to the input terminal B. The signal from an output terminal E is applied to the combining circuit 23.

The amplifier 51 generates a signal corresponding to the signal at the input terminal B and the signal from the voltage regulator circuit 55. The voltage regulator circuit 55 generates a constant voltage such that a given phase-relation is established on an average between the signal from the horizontal synchronizing signal separation circuit 27 and the signal from the voltage controlled oscillator 24 when the time base correction control is in operation.

Each of the switches 53 and 54 is short-circuited when the input terminal for operating and closing it goes to the high level and is opened when the input terminal goes to the low level.

When the input terminal A goes to the low level, the output of the inverting circuit 57 goes to the high level. Consequently, the output terminal of the amplifier 52 is connected to its inverting input terminal through the switch 54 so that the amplifier 52 does not operate as an amplifier and its output is zero.

When the input terminal A goes to the high level and the input terminal C goes to the low level, the output of the inverter circuit 56 goes to the high level and the output of the inverter circuit 57 goes to the low level, thus short-circuiting the switch 53 and opening the switch 54. As a result, the amplifier 52 operates as an integrator with a fast response determined by the parallel resistance value (the resistance value of $R_3 \times R_4/(R_3+R_4)$) of the fixed resistors $R_3$ and $R_4$ and the capacitance value of the capacitor $C_1$ and it generates a signal corresponding to the integral of the signal from the amplifier 51.

When both of the input terminals A and C go to the high level, both of the outputs of the inverter circuits 56 and 57 go to the low level and thus both of the switches 53 and 54 are opened. When this occurs, the amplifier 52 operates as an integrator circuit with a slow response determined by the resistance value of the fixed resistor $R_3$ and the capacitance value of the capacitor $C_1$ and it generates a signal corresponding to the integral of the signal from the amplifier 51.

The second and third control loops will be described with reference to FIG. 1.

When the input terminal A goes to the high level to enable the time base correction control, the integrator circuit 29 operates as the integrator with the fast response so that the signal from the phase comparator 28 is integrated and transmitted to the combining circuit 23. The combining circuit 23 transmits a composite signal of the signals from the phase compensating circuit 22 and the integrator circuit 29 to the voltage controlled oscillator 24 thus controlling it such that its output signal maintains a given phase relation with the signal from the horizontal synchronizing signal separation circuit 27. When the output of the phase comparator 28 is not within a given range, the output of the pull-in detecting circuit 33 goes to the low level and the integrator circuit 29 operates as the fast-response integrator. Thus, the second control loop has a fast response and it pulls into instantaneously.

When the output of the phase comparator 28 comes into the given range, the output of the pull-in detecting circuit 33 goes to the high level so that the integrator circuit 29 operates as the slow-response integrator and the switch 30 is short-circuited.

As a result, the response of the second control loop is decreased and the voltage controlled oscillator 24 is controlled in a manner that its phase is changed in accordance with the low frequency component of the signal from the phase comparator 28. Also the signal from the phase comparator 28 is applied to the element 10 via the switch 30, the phase compensating circuit 31 and the driver circuit 32 so that the element 10 moves the light beam on the recording medium 7 in the track direction and the time base variation or jitter is corrected.

In this case, the low frequency component of the time base variation is absorbed by the second control loop and the element 10 is controlled so as to move the light beam 2 in accordance with the high frequency component of the time base variation.

The phase compensating circuit 31 compensates the phase of the control system of the third control loop and the driver circuit 32 comprises a power amplifier for driving the element 10.

The first embodiment of the invention shown in FIG. 1 comprises the second third and fourth control loops and the three control loops are related to one another as will be described in detail hereunder.

Where the time base correction is not effected or when the input terminal A goes to the low level, the signal from the voltage controlled oscillator 24 is synchronized with the signal from the horizontal synchronizing signal separation circuit 19 by the fourth control loop.

Thus, while there is a phase difference between the signals from the horizontal synchronizing signal separation circuit 27 and the voltage controlled oscillator 24, the signals are practically the same in frequency and the second control loop pulls into faster and more stably.

Also, when the input terminal A is at the low level, the integrator circuit 29 does not operate as an integrator so that upon operation of the second control loop the integrator circuit 29 does not generate any signal which will cause a large disturbance and thus the second control loop pulls in stably and faster.

After the second control loop has pulled in, the pull-in detecting circuit 33 operates the integrator circuit 29 so as to pass only the low frequency component of the signal from the phase comparator 28. It is designed so that in this condition the loop gain of the second control loop in the low frequency range becomes greater than the loop gain of the fourth control loop in the low frequency range. As a result, the voltage controlled oscillator 24 is controlled by the second control loop in the low frequency range and is controlled by the fourth control loop in the high frequency range. Also, when there is any high frequency variation in the voltage controlled oscillator 24 itself, it is controlled by the fourth control loop to generate a highly stable signal. In accordance with the present invention, the signal from the voltage controlled oscillator 24 is very important from the standpoint of measuring the time base variation and therefore the role of the fourth control loop is also important.

After the second control loop has pulled in, the third control loop is operated through the pull-in detecting circuit 33 and the time base variation is corrected. In accordance with the invention, the loop gain of the second control loop becomes greater than the loop gain of the fourth control loop in the low frequency range. Thus, with the time base variation of the signals from the horizontal synchronizing signal separation circuits 19 and 27, the low frequency components are controlled by the second control loop and the high frequency components are controlled by the third control loop. As mentioned previously, the time base variation correction which takes place actually is only the one effected by the third control loop.

An embodiment of the phase comparator 28 of FIG. 1 will now be described with reference to FIG. 4.

Figure 4:
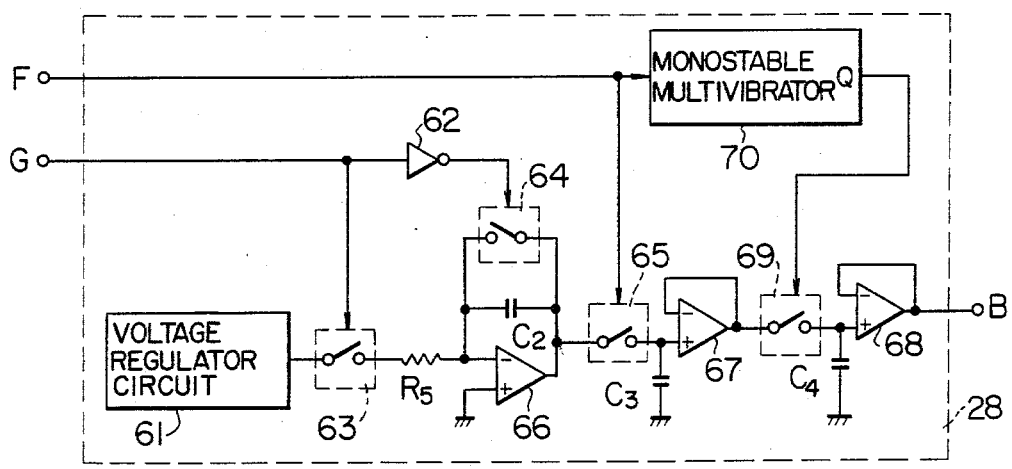
FIG. 4 is a circuit diagram showing the construction of a phase comparator 28.

Now referring to the corresponding relation between FIGS. 1 and 4, the signal from the horizontal synchronizing signal separation circuit 27 is applied to an input terminal F and the signal from the voltage controlled oscillator 24 is applied to an input terminal G. The output terminal B is connected to the input terminal of the switch 30, the pull-in detecting circuit 33 and the integrator circuit 29, respectively. Numeral 61 designates a voltage regulator circuit for generating a constant voltage, 62 an inverter circuit for inverting the signal applied to the input terminal G; 63, 64, 65 and 69 switches, 66, 67 and 68 differential amplifiers each having large amplification factor and input impedance, $R_5$ a fixed resistor, $C_2$, $C_3$ and $C_4$ capacitors and 70 a monostable multivibrator operable in response to the trailing edge of the signal at the input terminal F.

When the input terminal G goes to the high level, the switch 63 is short-circuited and the switch 64 is opened thereby causing the differential amplifier 66 to operate as an integrator which integrates the output of the voltage regulator circuit 61. When the input terminal G goes to the low level, the switch 63 is opened and the switch 64 is short-circuited thereby reducing the output of the differential amplifier 66 to zero potential.

When the input terminal F goes to the high level, the switch 65 is short-circuited and the differential amplifier 67 generates a signal of the same magnitude as the output from the differential amplifier 66. When the input terminal F goes to the low level, the switch 65 is opened and the differential amplifier 67 holds the output of the differential amplifier 66 just before the input terminal F going to the low level.

When the output of the monostable multivibrator 70 goes to the high level, the switch 69 is short-circuited and the differential amplifier 68 generates a signal of the same magnitude as the output from the differential amplifier 67. When the output of the monostable multivibrator 70 goes to the low level, the switch 69 is opened and the differential amplifier 68 holds the output of the differential amplifier 67 generated just before the output of the monostable multivibrator 70 going to the low level.

The operation of the phase comparator 28 of FIG. 4 will be described with reference to the timing chart of FIG. 5.

Figure 5:
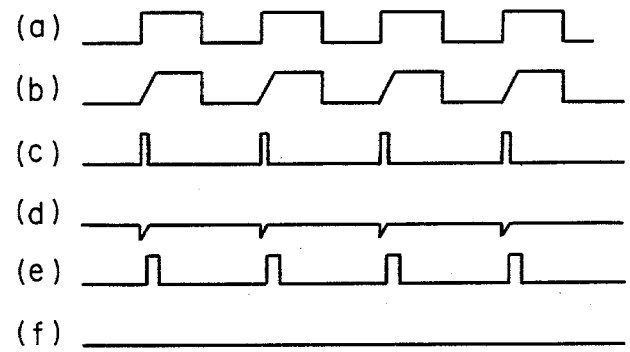
FIG. 5(a)-(f) is a timing chart for explaining the operation of the phase comparator 28 shown in FIG. 4.

In FIG. 5 showing the condition where the second control loop attains a given condition, the waveform (a) shows the signal waveform at the input terminal G, the waveform (b) shows the output waveform of the differential amplifier 66, the waveform (c) shows the signal waveform at the input terminal F, the waveform (d) shows the output waveform of the differential amplifier 67, the waveform (e) shows the output waveform of the monostable multivibrator 70, and the waveform (f) shows the output waveform of the differential amplifier 68.

The waveform (b) is clipped at a given level by the supply voltage of the differential amplifier 67.

When the output of the differential amplifier 67 is again sampled and held, the waveform (f) is produced so that the output variation caused during the short-circuit period of the switch 65 as shown by the waveform (d) is eliminated and the phase comparison is performed very accurately.

The phase comparator 21 may have the same construction as the phase comparator 28 shown in FIG. 4. The construction of the phase comparator 21 is shown in FIG. 6.

Figure 6:
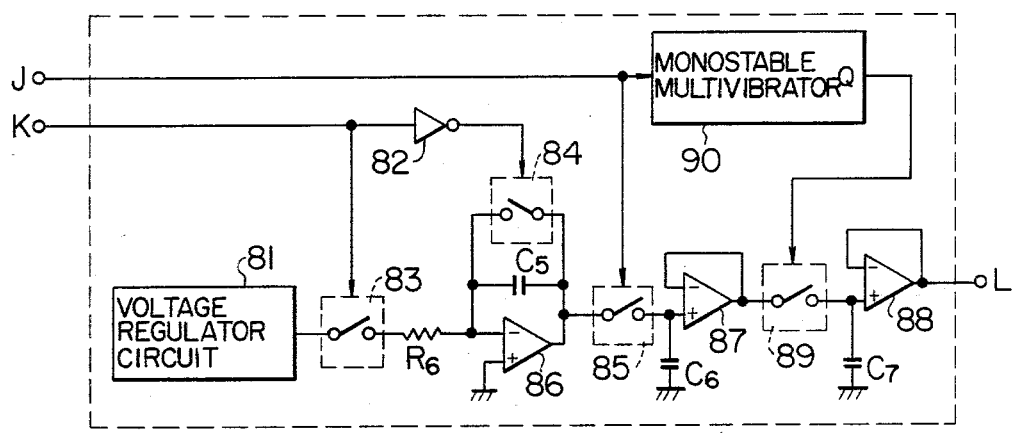
FIG. 6 is a circuit diagram showing the construction of a phase comparator 21.

The corresponding relation between FIGS. 1 and 6 is such that the signal from the frequency divider circuit 25 is applied to an input terminal J and the signal from the frequency divider circuit 20 is applied to an imput terminal K. An output terminal L is connected to the input terminal of the combining circuit 23.

Numeral 81 designates a voltage regulator circuit for generating a constant voltage, 82 an inverter circuit for inverting the signal applied to the input terminal K; 83, 84, 85 and 89 switches, 86, 87 and 88 differential amplifiers each having large amplification factor and input impedance, $R_6$ a fixed resistor, $C_5$, $C_6$ and $C_7$ capacitors, and 90 a monostable multivibrator operable in response to the trailing edge of the signal at the input terminal J.

The operation of the phase comparator 21 shown in FIG. 6 is the same with the phase comparator 28 shown in FIG. 4 and its detailed description will be omitted.

The operation of the phase comparator 21 of FIG. 6 will now be described with reference to the timing chart of FIG. 7. In the timing chart of FIG. 7 showing the waveforms produced when the frequency divider circuits 20 and 25 are each used as a 3:1 divider, the waveform (g) shows the signal waveform from the horizontal synchronizing signal separation circuit 19, the waveform (h) shows the signal waveform from the frequency divider circuit 20, the waveform (i) shows the signal waveform from the differential amplifier 86, the waveform (j) shows the signal waveform from the voltage controlled oscillator 24, the waveform (k) shows the signal waveform from the frequency divider circuit 25, the waveform (l) shows the signal waveform from the differential amplifier 87, the waveform (m) shows the signal waveform from the monostable multivibrator 90, and the waveform (p) shows the signal waveform from the differential amplifier 88.

Figure 7:
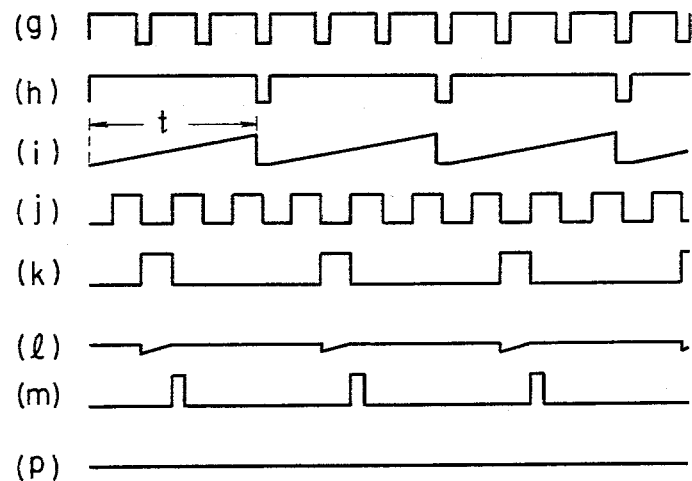
FIG. 7(g)-(m) and (p) are timing charts for explaining the operation of the phase comparator 21 shown in FIG. 6.

When the second, third and fourth control loops are in operation, the phase of the signal from the voltage controlled oscillator 24 (the waveform (j) shown in FIG. 7) is varied in accordance with the low frequency component of the time base variation. Thus, the phase of the signal from the frequency divider circuit 25 (the waveform (k)) is also varied and hence the output of the differential amplifier 87 (the waveform (1)) is varied. Designated at t in the waveform (i) is the time interval during which the waveform (i) increases and the time interval t is within the control range of the fourth control loop. In other words, if, due to the low frequency component of the time base variation, the waveform (k) shifts from the conditions of the waveforms (i) and (k) shown in FIG. 7 and exceeds the time interval t, the second, third and fourth control loops are disturbed making it impossible to correct the time base variation.

The frequency divider circuits 20 and 25 serve the function of increasing the control range of the fourth control loop. If the previously mentioned N is increased, the control range of the fourth control loop is increased in proportion thereto but the sampling frequency is decreased with the resulting deterioration in the response and control accuracy of the second and third control loops.

Thus, the value of N should preferably be determined such that the range of time base variation of the system is smaller than the interval t and the value is as small as possible.

While it is possible to select N=1 if the time base variation is small, this is equivalent to eliminating the frequency divider circuits 20 and 25.

The present invention can also be realized by using a delay circuit for the phase changing means.

Figure 8:
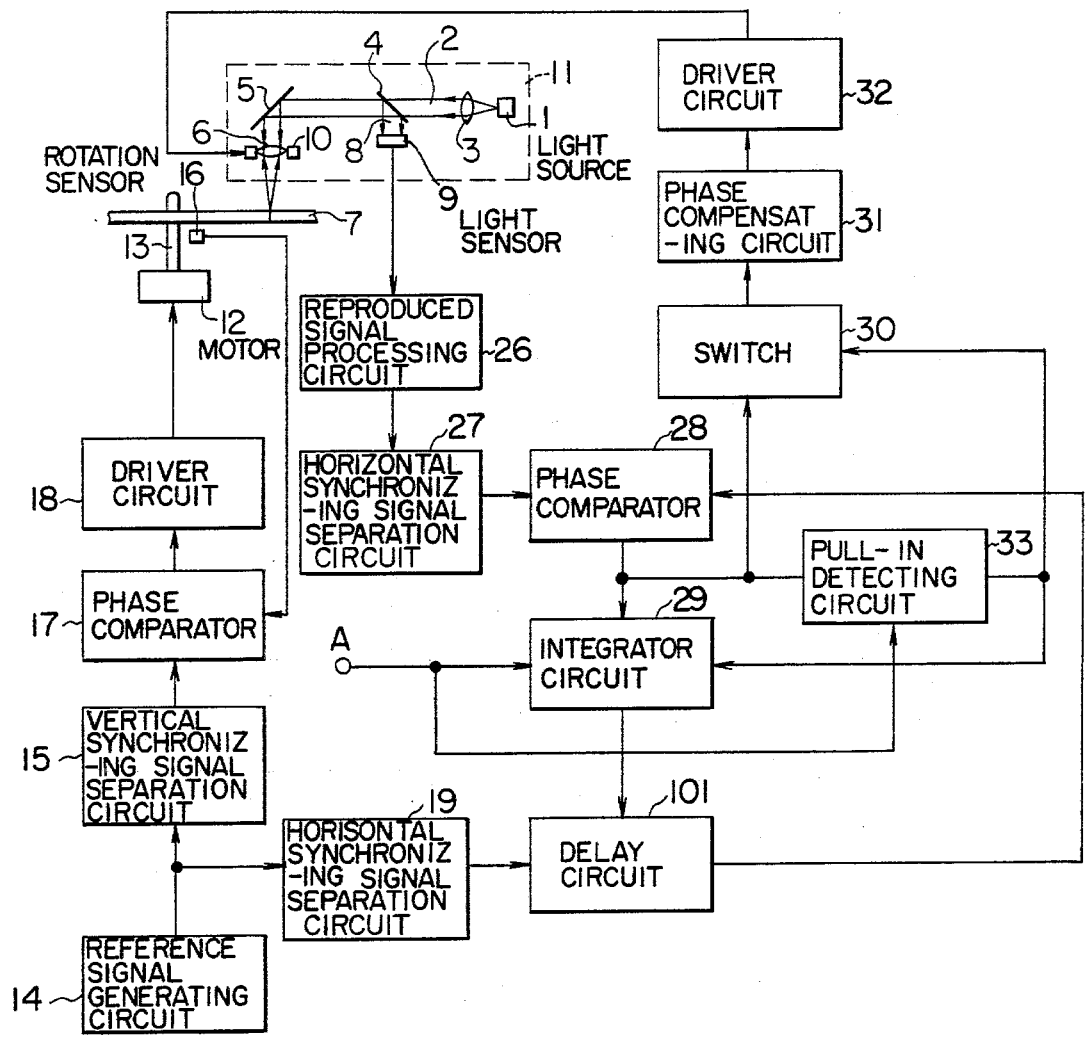
FIG. 8 is a block diagram showing another embodiment of the invention.

FIG. 8 shows another embodiment of the invention employing a delay circuit. The counterparts of the components in FIG. 1 will not be described in detail.

Numeral 101 designates a delay circuit which is so designed that when the input terminal A goes to the low level, a signal is generated which is synchronized with the signal from the horizontal synchronizing signal separation circuit 19 and having a given delay. When the input terminal A goes to the high level, the phase comparator 28 compares in phase the signal from the horizontal synchronizing signal separation circuit 27 and the signal from the delay circuit 101 and its output signal is transmitted to the delay circuit 101 through the integrator circuit 29. The delay circuit 101 changes its amount of delay in accordance with the signal from the integrator circuit 29.

As a result, the delay circuit 101 is controlled in such a manner that its output signal has a given phase relation with the signal from the horizontal synchronizing signal separation circuit 27. When the given phase relation is established between the signal from the horizontal synchronizing signal separation circuit 27 and the signal from the delay circuit 101, the pull-in detecting circuit 33 causes the integrator circuit 29 to operate as the slow-response integrator so that the amount of delay of the delay circuit 101 is varied in accordance with the low frequency component of the time base variation and the switch 30 is short-circuited thereby correcting the time base variation.

The second control loop comprises the phase comparator 28, the integrator circuit 29 and the delay circuit 101, and the third control loop comprises the phase comparator 28, the switch 30, the phase compensating circuit 31, the driver circuit 32, the optical system including the element 10, the reproduced signal processing circuit 26 and the horizontal synchronizing signal separation circuit 27.

Figure 9:
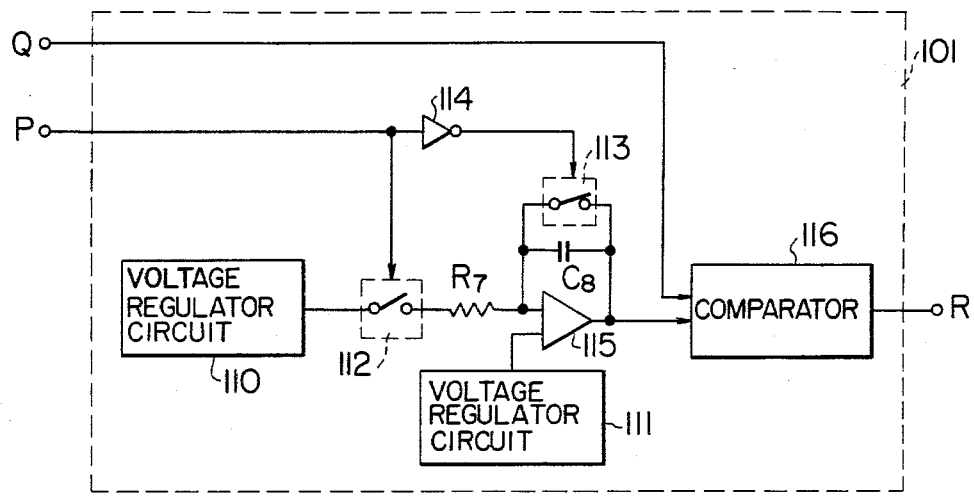
FIG. 9 is a circuit diagram showing the construction of a delay circuit 101.

FIG. 9 shows an embodiment of the delay circuit 101. The corresponding relation between FIGS. 8 and 9 is such that the signal from the horizontal synchronizing signal separation circuit 19 is applied to an input terminal P and the signal from the integrator circuit 29 is applied to an input terminal Q. An output terminal R is connected to the input terminal of the phase comparator 28.

Numerals 110 and 111 each designates a voltage regulator circuit for generating a constant voltage, 112 and 113 switches, 114 an inverter circuit for inverting the signal applied to the input terminal P, 115 a differential amplifier having large amplification factor and input impedance, 116 a comparator, $R_7$ a fixed resistor, and $C_8$ a capacitor.

When the input terminal P goes to the high level, the switch 112 is short-circuited and the switch 113 is opened thereby causing the differential amplifier 115 to generate a signal indicative of the integral of the output from the voltage regulator circuit 110. When the input terminal P goes to the low level, the switch 112 is opened and the switch 113 is short-circuited thereby causing the differential amplifier 115 to generate the same output as the output from the voltage regulator circuit 111. The comparator 116 compares in magnitude the signal from the differential amplifier 115 and the signal at the input terminal Q so that its output goes to the high level when the signal from the differential amplifier 115 is higher than the signal at the input terminal Q.

The operation of the delay circuit 101 of FIG. 9 will be described with reference to the timing chart of FIG. 10.

Figure 10:
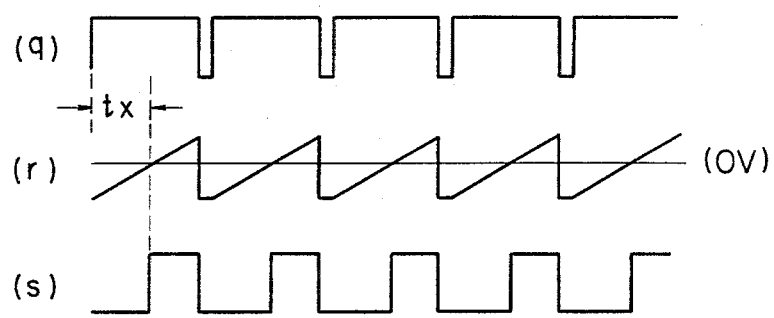
FIG. 10 is a timing chart for explaining the operation of the delay circuit 101 shown in FIG. 9.

In FIG. 10, the waveform (q) shows the signal waveform at the input terminal P, the waveform (r) shows the signal waveform from the differential amplifier 115, and the waveform (s) shows the signal waveform from the comparator 116. The waveform (r) is the waveform produced when the outputs of the voltage regulators 110 and 111 are both negative and the output of the voltage regulator circuit 110 is lower than that of the voltage regulator circuit 111, and the central straight line represents zero potential. Designated at tx is the time interval between the rise point of the waveform (q) and the rise point of the waveform (s) and it represents the delay time of the delay circuit 101. The delay time tx increases in proportion to an increase in the signal at the input terminal Q.

While the present invention has been described in detail by way of some embodiments, the invention is not intented to be limited to these embodiments in any way.

While the pull-in of the second control loop is detected by the pull-in detecting circuit 33, it is possible to arrange so that instead of using the pull-in detecting circuit 33, the pull-in of the second control loop is determined at the expiration of a given time after the transition of the input terminal A to the high level so that the response characteristic of the integrating circuit 29 is changed over and the third control loop is operated.

Also it is possible to arrange so that instead of using the horizontal synchronizing signal included in the video signal, a signal of a given frequency is recorded for time base variation correcting purposes so as to correct the time base variation included in this signal upon reproduction of the video signal. In this case, the given frequency should preferably be selected to be an integral multiple of the number of revolutions of the motor 12.

Further, while the present invention can of course be applied to other systems of the type which reproduces signals from a recording medium having a spiral track, the invention can also be applied to magnetic recording and reproducing systems, photomagnetic recording and reproducing systems, capacity reproducing systems, etc.

In accordance with the invention, the correction of time base variation or jitter can be accomplished with a high degree of reliability by means of a simple construction. Further, since the control systems can be caused to pull in at a high speed stably, the present invention proves to be very useful if it is applied to systems intended for high-speed searching purposes.

We claim:

1. A time base correction apparatus comprising:
    a disc-shaped recording medium having a signal track;
    first drive means for rotatably driving said disc-shaped recording medium;
    transducer means for reproducing signals recorded on said signal track of said recording medium;
    second drive means for moving said transducer means from one scanning position to another relative to said recording medium in a reverse direction of said signal track of said recording medium, responsive to a first control signal applied thereto;
    reference signal generating means for generating a reference signal;
    first control means receiving said reference signal, for controlling said first drive means to rotate said recording medium in phase synchronism with said reference signal;
    synchronizing signal detection means for separating a synchronizing signal from signals reproduced by said transducer means;
    variable phase means receiving said reference signal and a second control signal, said variable phase means including fourth control means producing an output which is controllable in synchronism with said reference signal and which has a phase which varies in accordance with said second control signal;
    phase comparison means for providing an output signal representing a phase difference comparison of a phase of said separated reproduced synchronizing signal with a phase of said output of said variable phase means;
    third control means receiving said output signal of said phase comparison means and applying it to said second drive means through a switching circuit, said output signal being provided to said second drive means through said switching circuit comprising said first control signal;
    an integrator circuit receiving a third control signal, said integrator circuit having a time constant which varies in accordance with said third control signal;
    second control means providing an output signal of said integrator circuit to said variable phase means, said output signal of said integrator circuit comprising said second control signal;
    detecting means receiving said output signal of said phase comparison means and for determining whether said output signal of said phase comparison means is within a predetermined range;
    actuating means for actuating said switching circuit to pass said first control signal responsive to a said output signal from said detecting means indicating that said output signal of said phase comparison means is within said predetermined range; and
    circuit means receiving said output signal from said detecting means and applying it to said integrator circuit to control said integrator circuit to have a predetermined small time constant when said output signal of said phase comparison means is not within said predetermined range and a predetermined large time constant when said output signal of said phase comparison means is within said predetermined range.

2. An apparatus according to claim 1, wherein said variable phase means includes a phase comparator, combining means and a variable oscillator, said phase comparator for comparing a phase of said reference signal with a phase of an output signal of said variable oscillator, said combining means for providing a control signal to said variable oscillator, said control signal provided by said combining means comprising an output of said phase comparator added with said second control signal, an output of said variable oscillator comprising said output of said variable phase means which is applied to said phase comparison means.

3. An apparatus according to claim 1, wherein said second control means has a loop gain greater than a loop gain of said third control means in a predetermined low frequency range.

4. An apparatus according to claim 1, wherein said integrator circuit has a gain which increases with a decrease in an input frequency applied thereto.

5. An apparatus according to claim 1, wherein said second control means has a loop gain greater than a loop gain of said fourth control means in a predetermined low frequency range.

6. An apparatus according to claim 1, wherein said variable phase means comprises a delay circuit for providing a delay which is varied in accordance with an input signal applied thereto.

* * * * *